US008438416B2

(12) United States Patent
Kocev et al.

(10) Patent No.: US 8,438,416 B2
(45) Date of Patent: May 7, 2013

(54) FUNCTION BASED DYNAMIC POWER CONTROL

(75) Inventors: Andrej Kocev, York, ME (US); Alexander Branover, Chestnut Hill, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 265 days.

(21) Appl. No.: 12/909,006

(22) Filed: Oct. 21, 2010

(65) Prior Publication Data

US 2012/0102344 A1   Apr. 26, 2012

(51) Int. Cl.
G06F 1/32 (2006.01)
G06F 1/10 (2006.01)

(52) U.S. Cl.
USPC ............ 713/601; 713/322; 713/323; 713/324

(58) Field of Classification Search .................... 713/300
See application file for complete search history.

(56) References Cited

U.S. PATENT DOCUMENTS

| | | | | |
|---|---|---|---|---|
| 5,628,020 A * | 5/1997 | O'Brien | | 713/322 |
| 5,737,615 A * | 4/1998 | Tetrick | | 713/324 |
| 5,884,088 A * | 3/1999 | Kardach et al. | | 713/324 |
| 6,141,283 A * | 10/2000 | Bogin et al. | | 365/226 |
| 6,282,662 B1 * | 8/2001 | Zeller et al. | | 713/300 |
| 6,480,965 B1 * | 11/2002 | Harriman et al. | | 713/322 |
| 6,496,895 B1 * | 12/2002 | Harriman et al. | | 710/306 |
| 6,760,852 B1 * | 7/2004 | Gulick | | 713/324 |
| 7,028,200 B2 * | 4/2006 | Ma | | 713/324 |
| 7,051,218 B1 * | 5/2006 | Gulick et al. | | 713/310 |
| 7,146,510 B1 * | 12/2006 | Helms et al. | | 713/300 |
| 7,162,404 B2 * | 1/2007 | Hunt et al. | | 703/16 |
| 7,174,467 B1 * | 2/2007 | Helms et al. | | 713/300 |
| 7,231,534 B2 * | 6/2007 | Ma | | 713/323 |
| 7,299,370 B2 * | 11/2007 | George et al. | | 713/322 |
| 7,444,526 B2 * | 10/2008 | Felter et al. | | 713/300 |
| 7,523,324 B2 * | 4/2009 | Ma | | 713/300 |
| 7,624,286 B2 * | 11/2009 | Lin et al. | | 713/300 |
| 7,644,293 B2 * | 1/2010 | Sistla et al. | | 713/323 |
| 7,750,912 B2 * | 7/2010 | Polzin et al. | | 345/501 |
| 7,788,516 B2 * | 8/2010 | Conroy et al. | | 713/340 |
| 7,882,998 B2 | 2/2011 | Roos | | |
| 8,140,868 B2 * | 3/2012 | Felter et al. | | 713/300 |
| 8,190,939 B2 * | 5/2012 | Fields et al. | | 713/324 |
| 8,209,559 B2 * | 6/2012 | Memon et al. | | 713/320 |
| 2003/0229821 A1 * | 12/2003 | Ma | | 714/8 |
| 2006/0053326 A1 * | 3/2006 | Naveh et al. | | 713/323 |
| 2006/0174142 A1 * | 8/2006 | Lin et al. | | 713/300 |

(Continued)

*Primary Examiner* — Ryan Stiglic
(74) *Attorney, Agent, or Firm* — Meyertons, Hood, Kivlin, Kowert & Goetzel, P.C.; Erik A. Heter

(57) ABSTRACT

A system and method for dynamic function based power control is disclosed. In one embodiment, a system includes a bridge unit having a memory controller and a communication hub coupled to the memory controller. The system further includes a power management unit, wherein the power management unit is configured to clock-gate the communication hub responsive to determining that each of a plurality of processor cores are in an idle state and that an I/O interface unit has been idle for an amount of time exceeding a first threshold. The power management unit is further configured to clock-gate the memory controller responsive to clock-gating the communication hub and determining that a memory coupled to the memory controller is in a first low power state. The power management unit may also perform power-gating of functional units subsequent to clock-gating the same.

31 Claims, 10 Drawing Sheets

U.S. PATENT DOCUMENTS

| | | | |
|---|---|---|---|
| 2007/0115290 A1* | 5/2007 | Polzin et al. | 345/501 |
| 2008/0005596 A1* | 1/2008 | Sistla et al. | 713/300 |
| 2008/0301475 A1* | 12/2008 | Felter et al. | 713/300 |
| 2009/0259862 A1* | 10/2009 | Bulusu et al. | 713/322 |
| 2010/0162014 A1* | 6/2010 | Memon et al. | 713/320 |
| 2010/0287394 A1* | 11/2010 | Branover et al. | 713/323 |
| 2011/0022857 A1* | 1/2011 | Nussbaum et al. | 713/300 |
| 2011/0112798 A1* | 5/2011 | Branover et al. | 702/186 |
| 2011/0113202 A1* | 5/2011 | Branover et al. | 711/135 |
| 2011/0148887 A1* | 6/2011 | Chong et al. | 345/501 |
| 2011/0264934 A1* | 10/2011 | Branover et al. | 713/320 |
| 2011/0296222 A1* | 12/2011 | Tan et al. | 713/324 |

* cited by examiner

FUNCTION BASED DYNAMIC POWER CONTROL

BACKGROUND

1. Field of the Invention

This invention relates to integrated circuits (IC's), and more particularly, to controlling the power consumption of IC's.

2. Description of the Related Art

During the design of a computer or other processor-based system, many design factors must be considered. A successful design may require several tradeoffs between power consumption, performance, thermal output, and so forth. For example, the design of a computer system with an emphasis on high performance may allow for greater power consumption and thermal output. Conversely, the design of a portable computer system that is sometimes powered by a battery may emphasize reducing power consumption at the expense of some performance. These same factors may be considered when designing the individual IC's to be used in the computer system.

Two commonly used methods of controlling power consumption are clock-gating and power-gating. When using clock-gating, a clock signal provided to units of an IC may be inhibited or otherwise blocked from reaching those units when utilizing a power saving mode. When power-gating is used, power may be removed from the units of the IC for operations in a power saving mode. Both clock and power-gating are used in some systems. For example, clock-gating may be used to put the units of an IC into an idle state that can quickly be exited by restoring the clock signal. Power-gating may be applied subsequent to clock-gating to place units into a sleep state in which no power or clock is received. Clock and power-gating may be applied to an IC, or multiple IC's, on a coarse or fine-grained basis. On a coarse-grained basis, power and clock-gating are performed for the multiple units of an IC concurrently. On a fine-grained basis, power and clock-gating may be applied to individual state elements and other circuits.

SUMMARY OF THE EMBODIMENTS OF THE DISCLOSURE

A system and method for dynamic function based power control is disclosed. In one embodiment, a system includes a bridge unit having a memory controller and a communication hub coupled to the memory controller. The system further includes a power management unit, wherein the power management unit is configured to clock-gate the communication hub responsive to determining that each of a plurality of processor cores are in an idle state and that an I/O interface unit has been idle for an amount of time exceeding a first threshold. The power management unit is further configured to clock-gate the memory controller responsive to clock-gating the communication hub and determining that a memory coupled to the memory controller is in a first low power state. The power management unit may also perform power-gating of functional units subsequent to clock-gating the same.

In one embodiment, a method includes clock-gating a communication hub of a bridge unit responsive to determining that each of a plurality of processor cores are in an idle state and that an I/O interface unit has been idle for an amount of time exceeding a first threshold. The method further includes clock-gating a memory controller of the bridge unit responsive to clock-gating the communication hub and determining that a memory coupled to the memory controller is in a first low power state.

BRIEF DESCRIPTION OF THE DRAWINGS

Other aspects of the invention will become apparent upon reading the following detailed description and upon reference to the accompanying drawings in which.

Figure 1:
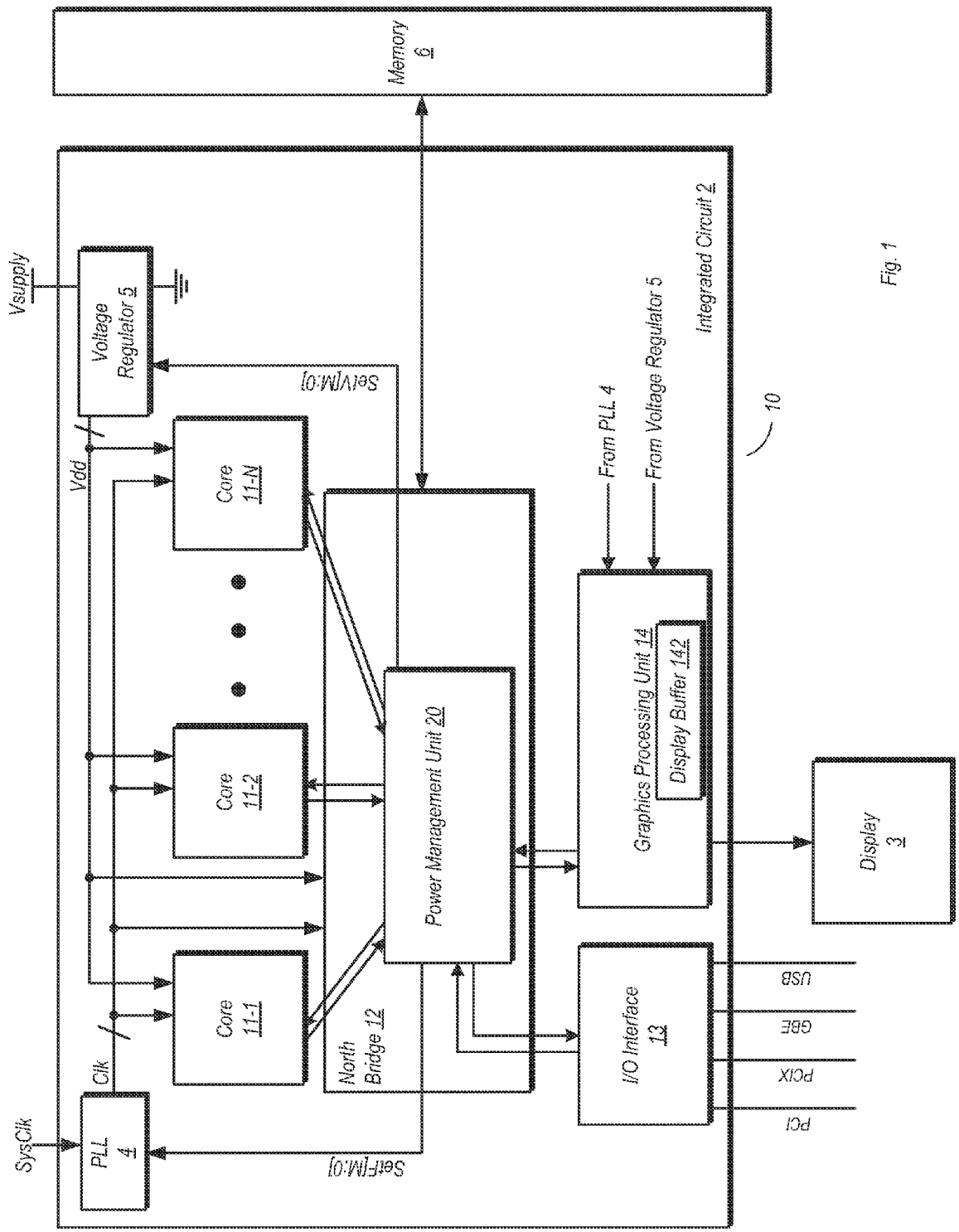
FIG. 1 is a block diagram of one embodiment of an integrated circuit (IC) system on a chip (SOC)

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Overview:

The present disclosure is directed to a method and apparatus for function-based dynamic power control of a bridge unit, such as a north bridge unit in a computer system. In one embodiment, a bridge unit such as a north bridge may include a power management unit configured to perform clock-gating of various functional units thereof when those units are idle. The power management unit may be further configured to perform power-gating of the various functional units if they are clock-gated for an extended time. The initial clock-gating of a particular functional may depend on an idle time exceeding at least a first time threshold and/or other conditions.

The functional units of the bridge unit may include various interfaces to other system components. Among these interfaces may be one or more processor core interfaces, an interface to an I/O bridge (e.g., a south bridge), a memory controller, and a graphics processing unit. The power management unit may monitor the activity of these various interfaces, and may perform clock/power-gating if these interfaces are idle for a time exceeding a threshold value. The time thresholds for determining whether to perform clock-gating and/or power-gating may in some cases be on the order of tens of nanoseconds or even as low as tens of nanoseconds. Similarly, latency associated with an exit of clock-gating and/or power gating may be on the order of tens of nanoseconds to tens of microseconds. Accordingly, controlling power consumption of the bridge unit may be performed in a highly dynamic and efficient manner, and may optimize power consumption by the bridge unit.

As used herein, the term clock-gating may be defined as inhibiting a corresponding clock signal from being provided to a unit configured to receive it, or alternatively, setting the clock frequency to zero for that unit. Discontinuing clock-gating may be defined as restoring the corresponding clock signal having a non-zero frequency to a unit for which clock-gating was previously performed. The term power-gating as used herein may be defined as removing power from a functional unit by disconnecting it from a corresponding operating (or supply) voltage, while discontinuing power-gating may be defined as re-connecting the corresponding operating voltage to that unit.

The various embodiments of a bridge unit discussed below, as well as embodiments of a computer system discussed below are exemplary, and not intended to be limiting. Other embodiments are possible and contemplated. Such embodiments may fall within the scope of this disclosure and may be configured to perform the various functions described below.

Processor With Power Management Unit:

FIG. 1 is a block diagram of one embodiment of an integrated circuit (IC) coupled to a memory. IC 2 and memory 6, along with display 3, form at least a portion of computer system 10 in this example. In the embodiment shown, IC 2 is a system on a chip (SOC) type processor having a number of processor cores 11 (e.g., 11-1, 11-2, and so forth). It is noted that the methodology to be described herein may be applied to other arrangements, such as multi-processor computer systems implementing multiple processors (which may be single-core or multi-core processors) on separate, unique IC dies. In multi-core embodiments, processor cores 11 may be identical to each other (i.e. homogonous multi-core), or one or more processor cores 11 may be different from others (i.e. heterogeneous multi-core).

Figure 2:
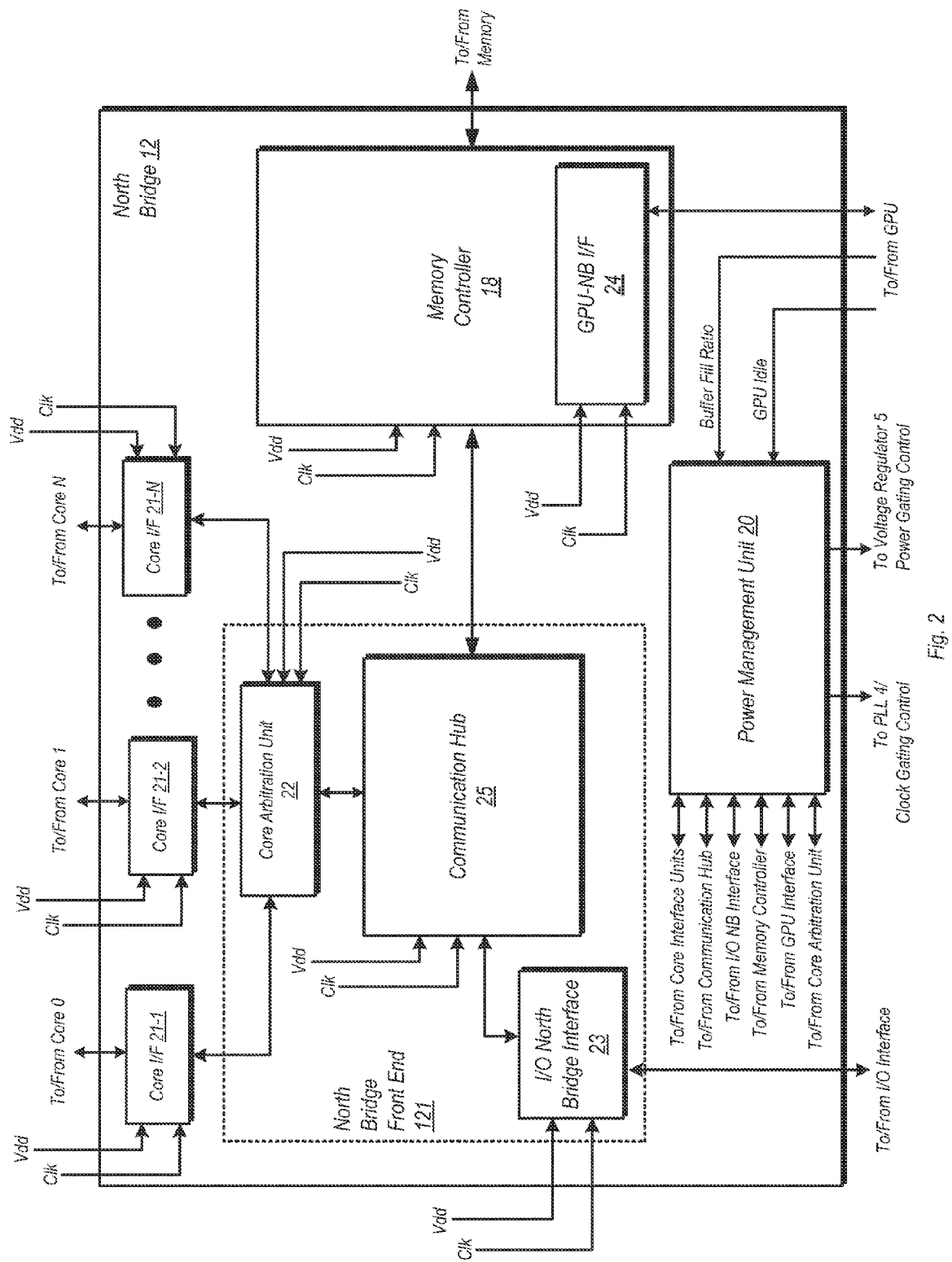
FIG. 2 is a block diagram of one embodiment of a north bridge.

Processor cores 11 may each include one or more execution units, cache memories, schedulers, branch prediction circuits, and so forth. Furthermore, each of processor cores 11 may be configured to assert requests for access to memory 6, which may function as the main memory for computer system 10. Such requests may include read requests and/or write requests, and may be initially received from a respective processor core 11 by north bridge 12. Requests for access to memory 6 may be routed through a memory controller 18, as shown in FIG. 2. Memory 6 may be implemented using one of many different various types of memory technologies. For example, memory 6 may be implemented using dynamic random access memory (DRAM) in one embodiment.

Each processor core 11 is coupled to north bridge 12 in the embodiment shown. North bridge 12 may provide a wide variety of interface functions for each of processor cores 11, including interfaces to memory and to various peripherals. In addition to being coupled to each of processor cores 11, north bridge 12 is also coupled to input/output (I/O) interface 13, graphics processing unit (GPU) 14, memory controller 18, phase-locked loop (PLL) 4, and voltage regulator 5. Additional functional units may also be included in some embodiments. North bridge 12 may serve as a communications hub for activity in computer system 10, routing and coordinating communications between processor cores 11, memory 6 (via memory controller 18), display 3 (via GPU 14), and various peripheral devices (via I/O interface 13). Additional details of north bridge 12 will be discussed below in reference to FIG. 2.

I/O interface 13 may function as a south bridge device in computer system 10. A number of different types of peripheral buses may be coupled to I/O interface 13. In this particular example, the bus types include a peripheral component interconnect (PCI) bus, a PCI-Extended (PCI-X), a PCIE (PCI Express) bus, a gigabit Ethernet (GBE) bus, and a universal serial bus (USB). However, these bus types are exemplary, and many other bus types may also be coupled to I/O interface 13. Peripheral devices may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to I/O unit 13 via a corresponding peripheral bus may assert memory access requests using direct memory access (DMA). These requests (which may include read and write requests) may be conveyed to north bridge 12 via I/O interface 13, and may be routed to memory controller 18.

GPU 14 may perform video processing functions for computer system 10. Video processing functions performed by GPU 14 may include basic video rendering, as well as 3-D graphics and other types of complex graphics functions. The video information processed by GPU 14 may be output for display on display 3, which may be one of a number of different types of display units. Display 3 may be implemented as flat panel liquid crystal display (LCD), a light-emitting diode (LED) display, a plasma display, a cathode ray tube (CRT) display, or any other suitable type.

In the embodiment shown, GPU 14 may include a display buffer 142 that may store data for display processing. The data for display processing may be read (or filled) from memory 6 in the unified memory architecture (UMA) embodiment shown, via memory controller 18 and north bridge 12. Thus, data to be processed by GPU 14 and rendered on display 3 may be stored in either display buffer 142 or memory 6. Accordingly, GPU 14 may be configured to send DMA requests to memory 6. As will be discussed below, GPU 14 may communicate with a memory controller of north bridge 12 via a GPU interface (e.g., GPU interface 24 of FIG. 2). The data processed by GPU 14 may be accessed from display buffer 142, which may then render images to be displayed on display 3. In some embodiments, GPU 14 may periodically fill display buffer 142, discontinue memory accesses, and allow display buffer 142 to be drained to a specified level before being filled again. The cycle may be repeated as necessary.

It is noted that in some embodiments, GPU 14 may be implemented within a given one of the processor cores 11, rather than separately as shown here. Similarly, related components, such a graphics interface unit and display buffer may be implemented within the given processor core 11.

In the embodiment shown, north bridge 12 includes a power management unit 20 that is configured to manage the power consumption of the various components of IC 2 in order to optimize its performance per watt. Power management unit 20 may perform a variety of power control actions for processor cores 11, GPU 14, I/O interface 13, and so on. These power control actions may include changing a clock frequency received by a functional unit, changing an operating voltage received by a functional unit, clock-gating a functional unit, and power-gating a functional unit. Power management unit 20 may also be configured to perform power control actions for the various functional units of north bridge 12.

In the embodiment shown, IC 2 includes a phase-locked loop (PLL) 4 coupled to receive a system clock signal. PLL 4 may distribute corresponding clock signals to each of processor cores 11, to GPU 14, and to the respective functional units of north bridge 12. In this embodiment, the clock signals received by each of processor cores 11, GPU 14, and the functional units of north bridge 12 are independent of one another. Power management unit 20 may generate a set of signals SetF[M:0] which indicate to PLL 4 (or to a clock control block or clock network control, not shown here) the frequency of the clock signal that is to be provided to those functional units of IC 2 that are configured to operate at a number of different clock frequencies (e.g., processor cores 11). In addiction, the SetF[M:0] signals may also be used to indicate to PLL 4 whether or not a given functional unit is to be clock-gated. PLL 4 may respond to such signal by inhibiting the clock signal from being provided to the given functional unit. Clock-gating may be performed on particular functional units, including those of north bridge 12, in executing power management schemes designed to optimize power consumption and performance per watt of the SOC implemented by IC 2.

In the embodiment shown, IC 2 also includes voltage regulator 5. Voltage regulator 5 may provide an operating voltage to each of processor cores 11, to GPU 14, I/O unit 13, and the various functional units of north bridge 12. For some units (e.g., processor cores 11), the operating voltage may be varied by voltage regulator 5 in accordance with the signals SetV[M:0] generated by power management unit 20. In addition, power management unit 20 may generate signals within SetV[M:0] indicating whether or not power-gating (i.e. to be turned off) for particular functional units, which may be performed in implementing the various power management schemes mentioned above.

It is noted that in some embodiments, PLL 4 and voltage regulator 5 may be implemented off-die, i.e. on IC's separate form IC 2. However, in such cases, PLL 4 and voltage regulator 5 may still be controllable by power management unit 20 of north bridge 12 for performing various power control actions.

North Bridge Unit:

FIG. 2 is a block diagram of one embodiment of north bridge 12. Other embodiments are possible and contemplated. In the embodiment shown, north bridge 12 may be functionally divided into a north bridge front end 121, a memory controller 18, a plurality of core interfaces 21, and a power management unit 20. North bridge 12 may serve as an interface for controlling communications between processor cores 11, memory 6, display 3, I/O unit 13 and the various peripheral devices coupled thereto (which may be referred to as the I/O domain).

In the embodiment shown, north bridge front end 121 in this embodiment includes an I/O north bridge interface 23, core arbitration unit 22, and communications hub 25. Core arbitration unit 22 in the embodiment shown is coupled to each of core interfaces 21. Each of the core interfaces 21 may be coupled to a corresponding one of processor cores 11, providing an interface between the core and north bridge 12. Core arbitration unit 22 may arbitrate communications from among the processor cores using an arbitration scheme. Possible arbitration schemes include round robin arbitration, priority-based arbitration, or any other suitable arbitration scheme.

I/O north bridge interface 23 may provide an interface between a south bridge device (e.g., I/O interface 13) and north bridge 12. Through I/O north bridge interface 23, DMA requests asserted by a peripheral device, as well as conveying data received responsive to DMA requests. Interrupt requests may also be conveyed to one of processing cores 11 via I/O north bridge interface 23. In general, I/O north bridge interface may be utilized for all communications between north bridge 12 (and the various units coupled thereto) and the I/O domain, including I/O interface 13.

North bridge front end 121 also includes communication hub 25, which may serve as an intersection point for communications between the I/O domain, processor cores 11, the memory, and GPU 14. Communications hub 25 may also be an intersection point for communications between and among processor cores 11. The various communications coordinated by communications hub 25 may be used to ensure cache coherency among processor cores 11 as well as with the corresponding data stored in memory 6. Communications hub 25 may also coordinate communications between GPU 14 and processor cores 11, as well as between GPU 14 and the I/O domain.

Memory controller 18 is configured to control accesses to memory 6 for both reads and writes. All data to be written to or read from memory 6 may pass through memory controller 18. Read and write requests may be generated by various peripheral devices in the I/O domain, and may be relayed to memory controller 18 through I/O north bridge interface 23 and communications hub 25. Read and write requests may also be asserted by any one of processor cores 11, and may also be relayed through memory controller 18 via their respective interfaces 21 to north bridge 12. GPU 14 may be configured to receive data from memory 6 responsive to read requests relayed into memory controller 18 via GPU north bridge interface 24, which may provide an interface to the GPU.

Each of the functional units of north bridge 12 described above may be coupled to receive an operating voltage, Vdd, and a clock signal, Clk. When idle, each of these functional units may be clock-gated to reduce power consumption. Additional power savings may be realized by power-gating these functional units, which may occur if they have been clock-gated for an additional period of time. It is noted that at least some of the functional units of north bridge 12 may be clock-gated or power-gated independently of other ones of the functional units.

Power management unit 20 in the embodiment shown is coupled to each of the functional units described above. Information received from each of these functional units may be used to determine whether or not these units are idle and a length of time that they have been idle. Power management unit 20 may also receive information the graphics subsystem indicating whether GPU 14 is idle as well as information regarding the amount of data stored in a display buffer within GPU 14. Using the information received from the various functional units, power management unit 20 may generate signals causing selected units to be clock-gated if they have been idle for a certain time and/or if other conditions have been met. Furthermore, if these functional units remain clock-gated for a sufficient amount of time (indicating that no wake-up event has occurred), the selected units may be power-gated. Clock-gating may and power-gating may enable power savings to be realized by reducing the amount of power consumed by inactive units. If a wake-up event occurs (e.g., a DMA request generated by a peripheral unit coupled to I/O interface 13), power management unit 20 may restore power and the clock signal to these units, enabling them to resume functioning as normal. A more detailed description of one embodiment of a power management unit 20 now follows.

Figure 3:
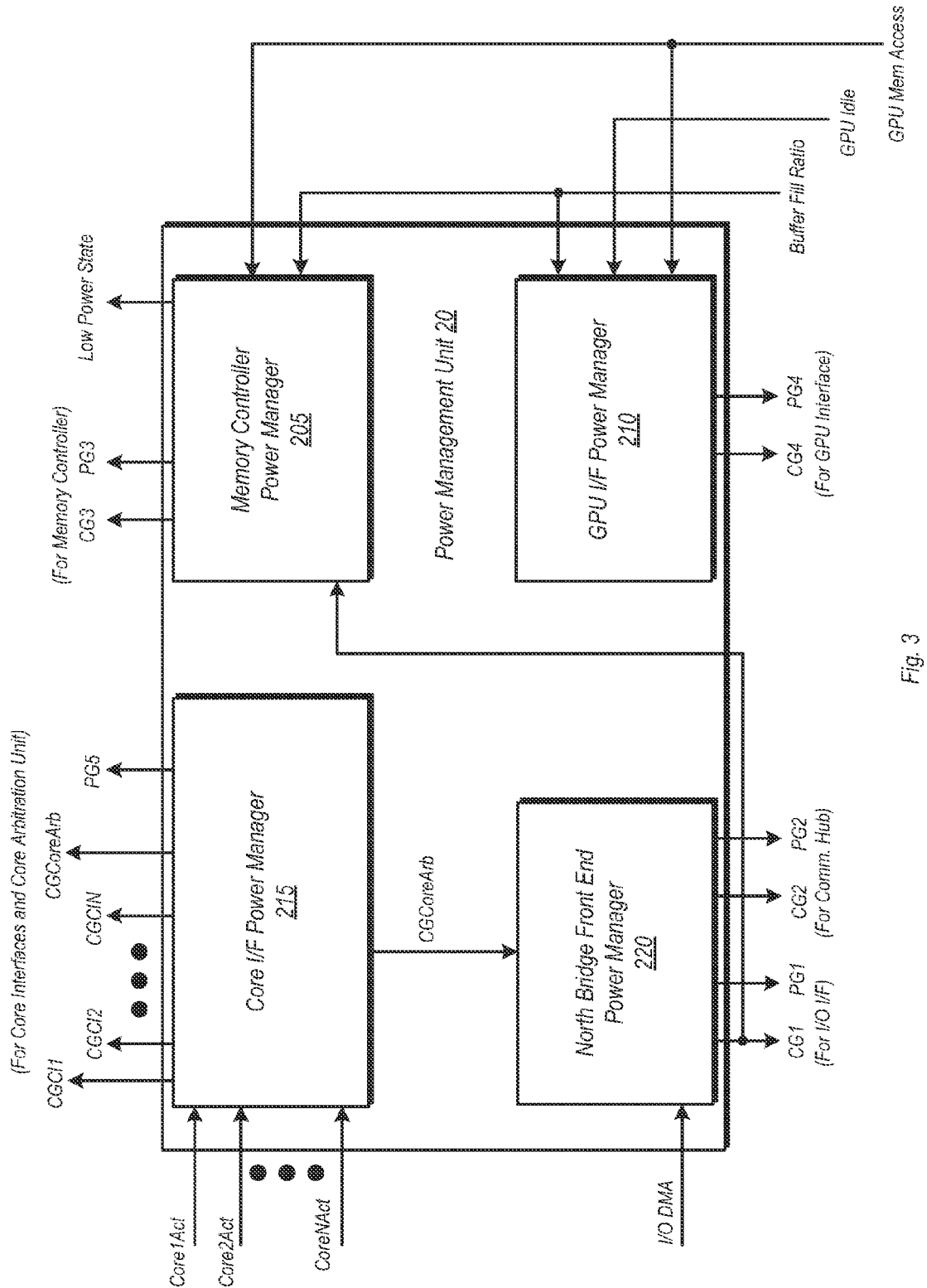
FIG. 3 is a block diagram of one embodiment of a power management unit.

Power Management Unit and Components:

FIG. 3 is a block diagram of one embodiment of a power management unit. Numerous other embodiments are possible and contemplated. In the embodiment of FIG. 3, power management unit 20 may be divided into four separate units: memory controller power manager 205, GPU interface (I/F) power manager 210, core interface (I/F) power manager 215, and north bridge front end (NBFE) power manager 220. Power management unit 20 is configured to generate a number of clock-gating signals (e.g., CG1-CG4, CGCI1, etc.) that may cause corresponding functional units of north bridge 12 to be clock gated. These signals may be provided from power management unit 20 to PLL 4 (or another type of clock control or clock network control block) as part of the group of signals SetF[M:0]. Power management unit 20 may also be configured to generate a number of power-gating signals that may cause the corresponding functional units of north bridge 12 to be power-gated. The power-gating signals may be provided to voltage regulator 5 (or other type of power gating controller) as part of the group of signals SetV[M:0]. It is noted that the other clock-gating signals (CG3, CG4, etc.) and power-gating signals (PG3, PG4, etc.) may also be included in the signal groups SetF[M:0] and SetV[M:0], respectively.

NBFE power manager 220 in the embodiment shown is coupled to receive an I/O DMA signal which may be indicative of a DMA request generated from within the I/O domain NBFE power manager 220 may also receive another signal indicating when each and every one of processor cores 11 is idle. If NBFE power manager 220 does not receive an indication of an I/O DMA request for a time exceeding a first time threshold, and receives a signal indicating that all processor cores 11 are idle, it may cause I/O north bridge interface 23 to be clock-gated. Clock-gating of the I/O north bridge interface may be accomplished responsive to the assertion of the signal CG1.

NBFE power manager 220 may continue monitoring I/O north bridge interface 23 for an extra amount of time up to a second time threshold. If the amount of time since the most recent DMA request from the I/O domain exceeds the second time threshold, NBFE power manager 220 may assert the CG2 signal to cause the clock-gating of communication hub 25. It is noted however if a DMA request is received from the I/O domain at any time when one or both of I/O north bridge interface 23 and communications hub 25 are clock-gated, NBFE 220 may discontinue clock-gating these units (by de-asserting CG2 and CG1, respectively) to allow them to return to an active state so that the requested access may be completed. It is further noted that embodiments are possible and contemplated wherein CG2 is asserted to clock-gate communication hub 25 without delay once I/O north bridge interface 23 is clock-gated.

If I/O north bridge interface 23 continues to remain idle for a specified threshold time subsequent to clock-gating, NBFE power manager 220 may assert the PG1 signal. This may cause I/O north bridge interface 23 to be power-gated. Similarly, if I/O communication hub 25 continues to remain clock-gated, it too may be power-gated responsive to NBFE power manager 220 asserting the PG2 signal.

GPU I/F power manager 210 may assert the CG4 signal responsive to the occurrence of three different conditions in this particular embodiment. A first of these conditions is an assertion of the GPU Idle signal, thereby indicating that GPU 14 is idle and no interaction with other components of north bridge 12 is expected. The GPU Idle signal may be asserted when display 3 is no longer updating and thus is not draining display buffer 142. It is noted that the GPU Idle signal need not be asserted by GPU 14 itself (e.g., it may be asserted by a separate timer used to detect activity from GPU 14). It is further noted that the GPU Idle signal may not be included in all embodiments, and thus only two conditions are necessary to assert CG4 in such embodiments.

A second condition required to cause the assertion of the CG4 signal in the embodiment occurs when the amount of data stored in display buffer 142 exceeds a certain threshold value. A third condition required for assertion of the CG4 signal in this embodiment occurs when a specified period of time has elapsed since the most recent memory access by GPU 14. Responsive to the occurrence of each of these conditions, GPU I/F power manager 215 in the embodiment shown may assert the CG4 signal to cause the GPU interface 24 to be clock-gated. It is noted that embodiments are possible and contemplated wherein the occurrence of any one of these conditions may cause assertion of the CG4 signal. If the GPU interface 24 remains clock-gated for a specified amount of time, GPU I/F power manager 210 may assert the PG4 signal in order to cause the GPU interface 24 to be power-gated.

Core I/F power manager 215 may be coupled to receive various signals from each of processor cores 11 (designated here as Core1Act, Core2Act, etc.). It is noted that each Core1Act, Core2Act, etc., may each represent multiple signals, although for the sake of simplicity only a single signal path is shown here for each. These signals may indicate whether or not there is activity in the corresponding processor cores 11. The received signals may indicate cache access attempts, cache misses, instructions issued, executed, or retired, memory access requests, and so on. In general, any suitable signal or signals that indicates activity of a processor core 11 may be provide to core I/F power manager 215. For example, in an embodiment compliant with the Advanced Configuration and Power Interface (ACPI) specification, and indication that a given processor core 11 is in a non-C0 state (where C0 is the ACPI operating state) may result in a signal indicating core inactivity.

Using the signals that indicate inactivity, core I/F power manager 215 may monitor each processor core 11 for idleness. If a given one of processor cores 11 does not exhibit any activity for a specified amount of time, and the caches of that core has been flushed, core I/F power manager 215 may assert a corresponding clock-gating signal to clock-gate a corresponding core interface 21 (e.g., CGCI1 may be asserted to clock-gate core interface 21-1). If a clock-gated core interface 21 remains in the clock-gated state (i.e. no wake-up event occurs, such as an interrupt), then a power-gating signal may be asserted to power-gate the corresponding core interface.

If core I/F manager 215 determines that all of core interfaces 21 are clock-gated, it may assert the CGCoreArb signal to cause core arbitration unit 22 to be clock gated. In this particular embodiment, if the core interfaces 21 and core arbitration unit 22 remain clock-gated for a specified time, it may assert the PG5 signal to power-gate each of these units. However, it is noted that other embodiments are possible and contemplated wherein each of core interfaces 21 and core arbitration unit 22 may be power-gated independently. In such cases, an embodiment of core I/F power manager 215 may be configured to assert separate power gating signals for each of the core interfaces 21 and core arbitration unit 22.

Memory controller power manager 205 in the embodiment shown is configured to receive a number of different signals. From NBFE power manager 220, memory controller power manager 205 may receive the CG1 signal when communications hub 25 is clock-gated. Memory controller power manager 205 is also coupled to receive a signal indicating the fill ratio of the display buffer 142 and indications when GPU 14 requests a memory access.

Memory controller power manager 205 may monitor each of processor cores 11, GPU 14, and I/O interface 13 for memory access requests. If no memory access request is asserted for any of these units for a specified amount of time, and the buffer fill ration (for display buffer 142) exceeds a certain threshold, memory controller power manager 205 may respond by asserting the low power state signal. This signal may be received by memory controller 18, and may cause it to place memory 6 into a low power state (e.g., a self-refresh state). If memory 6 is in a low power state and the CG1 signal is asserted (indicating that communication hub 25 is clock-gated), memory controller power manager 205 may respond by asserting the CG3 signal. Responsive to assertion of the CG3 signal, memory controller 18 may be clock-gated. Memory controller 18 may also be power gated if it remains clock gated for a specified amount of time.

Figure 4:
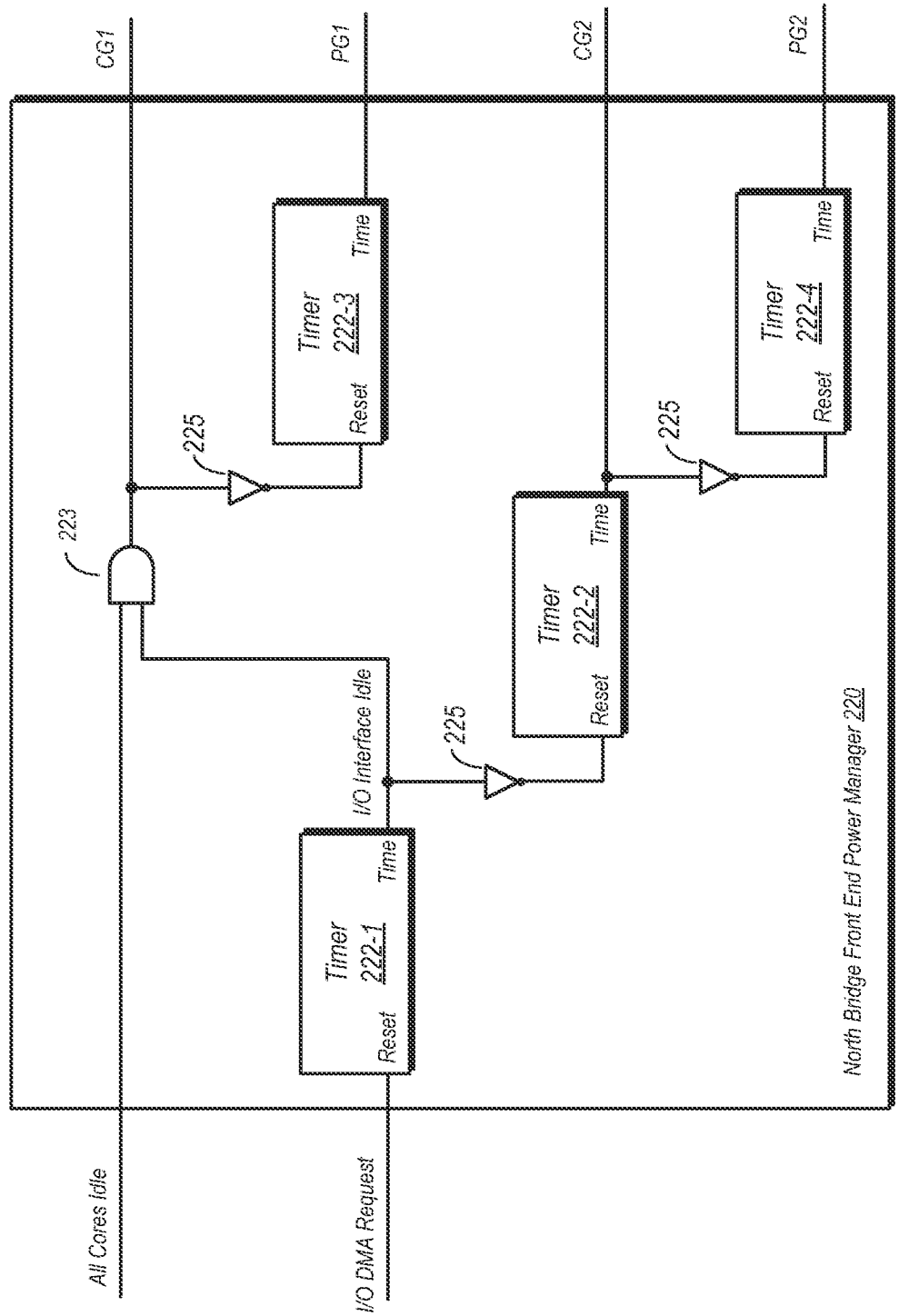
FIG. 4 is a diagram illustrating one embodiment of a north bridge front end power management unit.

FIG. 4 is a diagram illustrating one embodiment of NBFE power manager 220. In the embodiment shown, NBFE power manager 220 includes an AND gate 223 coupled to receive the CGCoreArb signal on a first input. When asserted, this signal may indicate that all processor cores 11 are idle and clock-gated. The other input of AND gate 223 may be coupled to receive the signal I/O Interface Idle. This signal may be generated responsive to the absence of a DMA request from the I/O domain for a specified amount of time. When an I/O DMA request is asserted, it may reset timer 222-1. Timer 222-1 may continue running until it reaches a specified time (e.g., a first time threshold), after which the I/O Interface Idle signal may be asserted. When this signal and the CGCoreArb signal are both asserted, the CG1 signal may be asserted by the AND gate 223. I/O north bridge interface 23 may be clock-gated as a result of the assertion of CG1.

When the I/O Interface Idle signal is not asserted, timer 222-2 may be held in a reset state due to inverter 225. When the I/O Interface Idle is asserted, timer 222-2 may begin running up until another specified time (e.g., a second time threshold) is reached. Responsive to reaching the second time threshold, timer 222-2 may assert the CG2 signal, which may cause communication hub to be clock-gated. The extra time between the clock-gating of I/O north bridge interface 23 and communication hub 25 may provide a hysteresis for in-flight memory traffic from the I/O domain. If such traffic exists, it may cause both I/O north bridge interface 23 and communication hub 25 to exit the clock-gated state.

Timer 222-3 may similarly be held in a reset state (due to another inverter 225) when the CG1 signal is not asserted. When CG1 is asserted, timer 222-3 may begin running until another time threshold is reached. Responsive to reaching this time threshold, timer 222-3 may assert the PG1 signal, which may in turn cause I/O north bridge interface 23 to be power-gated. Communication hub 25 may similarly be power-gated responsive to the assertion of the PG2 signal by timer 222-4, which may also be held in a reset state when the I/O Interface Idle signal is not asserted.

Figure 5:
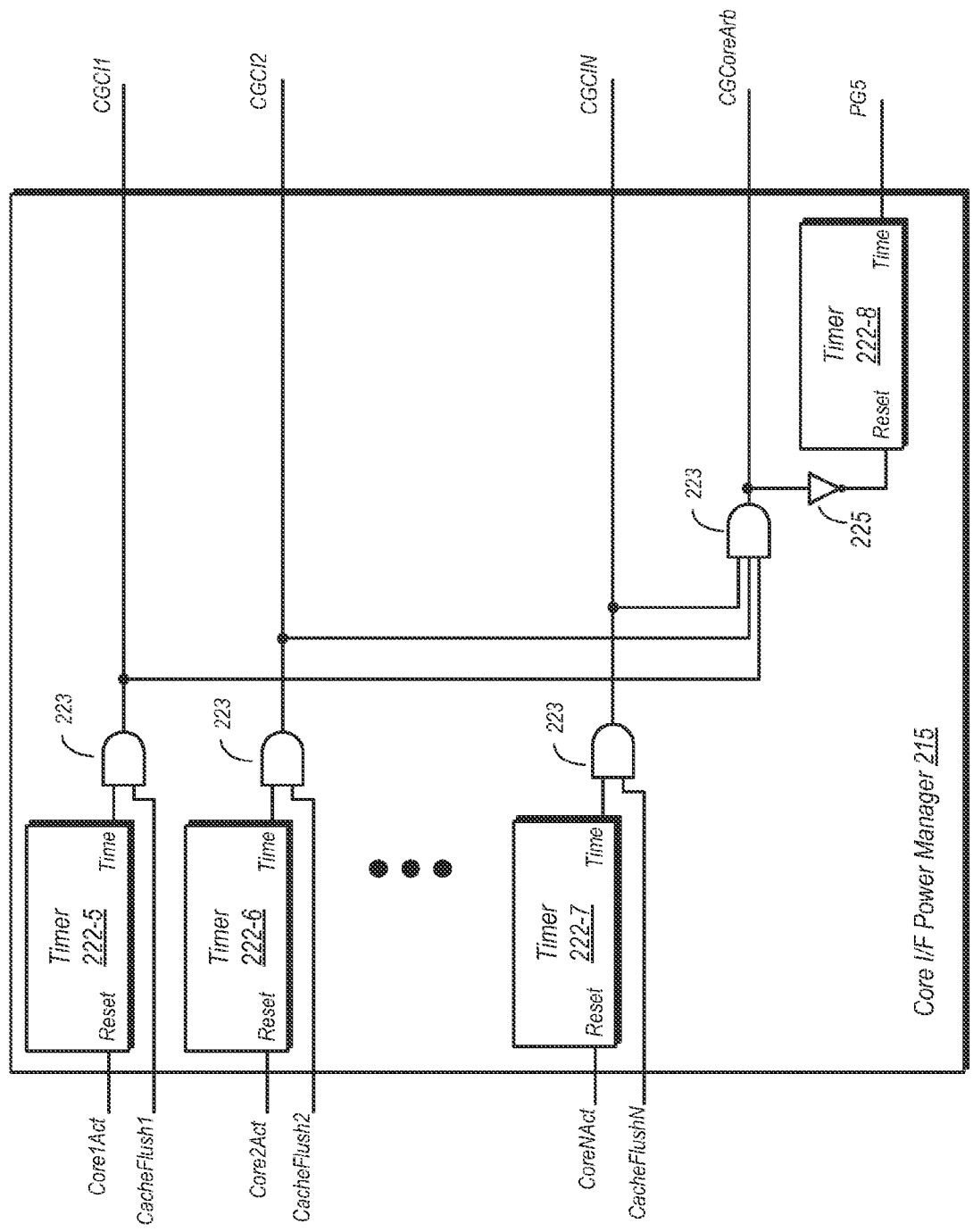
FIG. 5 is a diagram illustrating one embodiment of a core interface power manager.

FIG. 5 is a diagram illustrating one embodiment of core I/F power manager 215. in the embodiment shown, timers 222-5, 222-6, and 222-7 are each coupled to receive on respective reset inputs activity indications from corresponding ones of processor cores 11. It is noted that the number of timers 222 in a particular embodiment of core I/F power manager 215 may correspond to the number of processor cores of the processor embodiment in which it is implemented. Accordingly, the number of these timers 222 may vary from one embodiment to the next.

The activity signals received by timers 222-5, 222-6, and 222-7 in this embodiment may be based on various metrics indicative of processor core activity. Such metrics may include instructions executed, instructions retired, pipeline stalls, branch mispredictions, and so forth. In general, any suitable metric that is indicative of processor core activity may be used. Signals corresponding to these metrics may be logically combined (e.g., using an OR gate) to generate the activity signals Core1Act, Core2Act, and so forth. For each instance that one of these core activity signals is asserted, the receiving timer 222 may be reset. When a core activity signal is not asserted, the receiving timer 222 may exit the reset state and begin running. If a threshold time is reached, the timer 222 may assert a signal on its Time output, thereby indicating that no core activity has been detected for a time greater than the time threshold. If the caches of the corresponding core have been flushed, then a corresponding AND gate 223 in the embodiment shown may assert the appropriate clock-gating signal. For example, if timer 222-5 asserts a signal on its Time output, and the 'CacheFlush1' signal is also asserted (indicating that core #1's caches have been flushed), the corresponding AND gate 223 may assert the CGCI1 signal, thereby causing core interface 21-1 to be clock-gated.

As noted above, in an ACPI-compliant embodiment, a lack of activity of a given processor core 11 may cause that core to enter a non-C0 (i.e. non-operating) state. In such embodiments, the activity signals (e.g., Core1Act) may be asserted when the respective processor core 11 is in the C0 state, thereby holding a respective timer (e.g., timer 222-5) in a reset state. Once the C0 state is exited for that processor core 11, the corresponding timer 222 may be allowed to exit the reset state and begin running. If the timer reaches its threshold time, its Time output may be asserted. If the corresponding CacheFlush (e.g., CacheFlush1) signal is asserted, the respective processor core 11 may be clock gated.

In the embodiment shown, each of the clock-gating signals may be ANDed together by another AND gate 223. If each of the processor cores 11 is clock-gated, the corresponding AND gate 223 may assert the CGCoreArb signal, thereby causing the core arbitration unit 22 to be clock-gated.

When the CGCoreArb signal is not asserted, timer 222-8 may be held in a reset state as the result of the output of the inverter 225 coupled to its reset input. Responsive to assertion of the CGCoreArb signal, timer 222-8 may exit the reset state and may begin running. If the corresponding time threshold is reached, timer 222-8 may respond by asserting the PG5 signal, which may be provided to each of core interfaces 21 and core arbitration unit 22. Responsive to receiving the asserted PG5 signal, each of the core interfaces 21 and core arbitration unit 22 may be power-gated. It is noted however that alternate embodiments are possible and contemplated wherein each of the core interfaces 21 may be power-gated independently of one another. In one such embodiment, corresponding power-gating signals may be generated in a manner similar to that which PG5 is generated. For example, in such an embodiment, the signal path for CGCI1 could be coupled to a corresponding timer 222, via an inverter 225, with the timer held in the reset state until the CGCI1 signal is asserted. A corresponding power-gating signal exclusive to that processor core 11 could be asserted at a threshold time subsequent to the corresponding timer 222 exiting the reset state.

Figure 6:
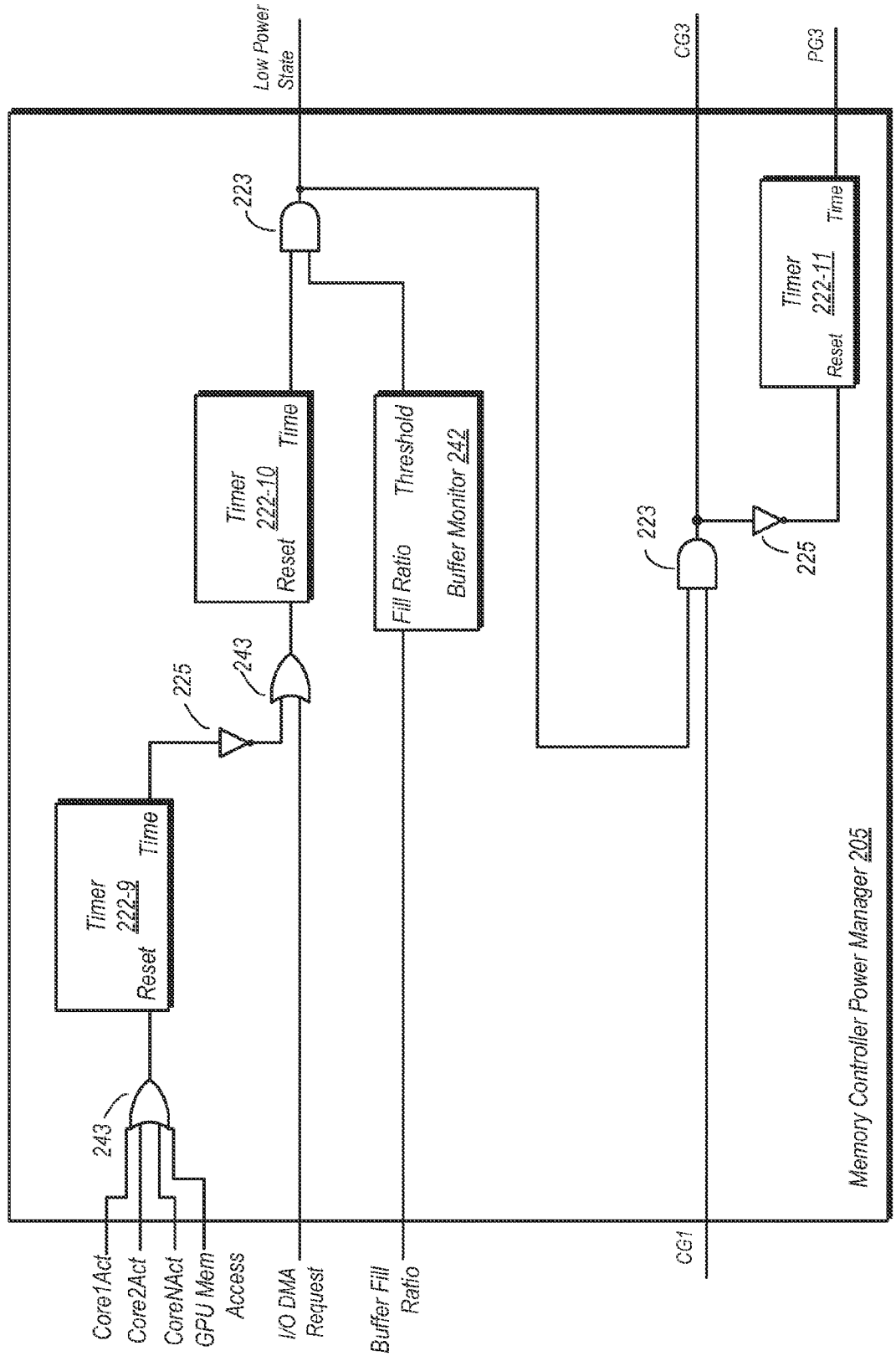
FIG. 6 is a diagram illustrating one embodiment of a memory controller power manager.

One embodiment of memory controller power manager 205 is illustrated in FIG. 6. In the embodiment shown, memory controller power manager 205 is coupled to receive memory request indications from each of the processor cores 11 and from GPU 14. The indications of these requests may be ORed together by an OR gate 243, the output of which is coupled to the reset input of timer 222-9. Accordingly, for each instance of a memory request asserted by at least one of processor cores 11 and GPU 14, timer 222-9 may be reset. In an ACPI-compliant embodiment, the core activity signals (e.g., Core1Act) may remain asserted when the corresponding processor core 11 is in the C0 state. Thus, when any processor core 11 is in the C0 state, the output of OR gate 243 may be asserted. When the output of OR gate 243 is not asserted, timer 222-9 may exit the reset state and may begin running If the amount of time elapsed since the most recent memory request reaches a threshold value, timer 222-9 may assert a signal on its time output.

The signal conveyed from the Time output by timer 222-9 may be inverted by an inverter 225, with its complement being provided as an input to the 2-input OR gate 243 coupled to timer 222-10. The other input to the 2-input OR gate 243 is coupled to receive an indication of an I/O DMA request. Thus, in the configuration shown, timer 222-10 may be held in a reset state when the Time output of timer 222-9 is not asserted. If the Time output of timer 222-9 is asserted, timer 222-10 may be permitted to exit the reset state, but may be subsequently reset at any point if an I/O DMA request is made. Therefore, timer 222-10 may assert an output signal on its Time output if no memory access request or interrupt request has been made by or to any of processor cores 11 or GPU 14 for at least a first amount of time, and if no I/O DMA request have been made for at least a second amount of time.

The Time output of timer 222-10 is coupled to a first input of an AND gate 223 that is configured to generate the Low Power State signal. The second input of this AND gate 222 is coupled to receive a signal from the Threshold output of buffer monitor 242. Buffer monitor 242 in the embodiment shown is configured to monitor the fill ratio of display buffer 142. If the amount of data stored in display buffer 142 exceeds a specified threshold value, then buffer monitor 242 may assert a signal on its Threshold output. Otherwise, the signal may remain deasserted.

Embodiments are also possible and contemplated wherein, in lieu of using the state of the buffer fill ratio as a threshold indication, an indication of whether or not system memory is in a self-refresh state (e.g., DRAM self-refresh) may be used. It is noted that entry into the self-refresh state may require that the buffer fill ratio to exceed the specified threshold. Thus, an indication that the buffer fill ratio exceeds the threshold may be inherently indicated when indicating that system memory is in the self-refresh state.

When signals are asserted on both the Threshold output of buffer monitor 242 and the Time output of timer 222-10, the AND gate 223 to which these units are coupled may assert the Low Power State signal. The Low Power State signal may be received by memory controller 18, which may respond thereto by placing memory 6 in a low power state (e.g., into a self-refresh state). If both the Low Power State and CG1 signals are asserted, another AND gate 223 may assert the CG3 signal. Responsive to assertion of the CG3 signal, memory controller 18 may be clock-gated.

Timer 222-11 is coupled to receive a complement of the CG3 signal on its Reset input in the embodiment shown. If CG3 is not asserted, timer 222-11 may be held in a reset state. When the CG3 signal is asserted, timer 222-11 may exit the reset state and begin running Once the threshold time of timer 222-11 has been reached, the PG3 signal may be asserted. Responsive to assertion of the PG3 signal, memory controller 18 may be power-gated.

Figure 7:
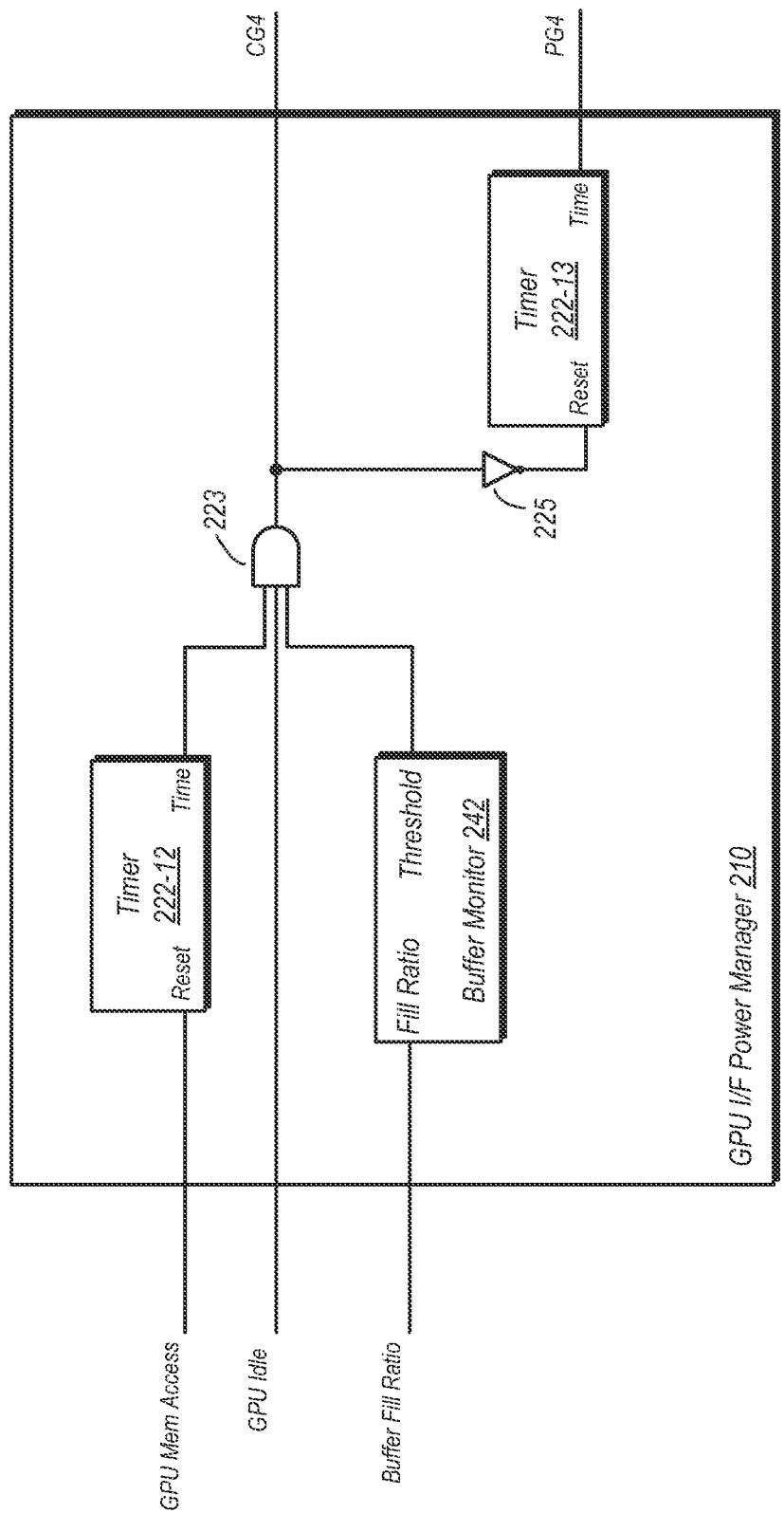
FIG. 7 is a diagram illustrating one embodiment of a GPU interface power manager.

FIG. 7 is a diagram illustrating one embodiment of GPU I/F power manager 210. GPU I/F power manager 210 may cause GPU north bridge interface 24 to be clock gated by asserting the CG4 signal. In the embodiment shown, GPU I/F power manager 210 may assert the CG4 signal responsive to of the occurrence of three different conditions. The occurrence of these conditions may indicate that GPU 14 is not expected to communicate with north bridge 12 (e.g., to provide a memory access request to memory controller 14). In such situation, power savings may be realized by clock-gating GPU north bridge interface 24.

A first of these conditions occurs if GPU 14 has not requested a memory access for a specified period of time. For each memory access asserted by GPU 14, timer 222-12 may be reset. If the amount of time elapsed since the most recent memory access request exceeds a time specified is greater than or equal to a time specified by timer 222-12, the Time signal from this timer may be asserted and propagated to a first input of AND gate 223.

A second condition that may cause assertion of the CG4 signal is the assertion of the GPU Idle signal. The GPU Idle signal may be asserted if it is determined, that display 3 is no longer updating or other conditions occur in which it is not expected to update. Furthermore, the GPU Idle signal may be asserted regardless of the amount of data stored in buffer monitor 242. The GPU Idle signal may be received as a second input to AND gate 223. It is noted that the GPU Idle signal may not be required in some embodiments.

The third condition may occur when the amount of data stored in display buffer 142 exceeds the threshold value as determined by buffer monitor 242. When a large amount of data is stored in display buffer 142, GPU 14 may be able to process data for display on display 3 without requesting access to memory 6 for a non-trivial amount of time. Thus, in this situation power savings may be realized by clock-gating GPU north bridge interface 14 even though GPU 14 may be actively processing data for display at this time. In some embodiments, two separate thresholds may be implemented, one high threshold and one low threshold. The high threshold may be used to trigger clock-gating of the GPU north bridge interface 24. The low threshold may be used to trigger the discontinuing of clock-gating of GPU north bridge interface 24 in anticipation of memory access requests from GPU 14 to refill display buffer 142. When the amount of data exceeds the threshold value, buffer monitor 242 may assert the threshold signal, which may be received as a third input to AND gate 223. When all three of its inputs are asserted, AND gate 223 may assert the CG4 signal as its output.

The complement of CG4 may also be provided to the reset input of timer 222-13, via inverter 225 as shown in FIG. 7. When CG4 is not asserted, timer 222-13 may be held in a reset state. When CG4 is asserted, timer 222-13 may be permitted to exit the reset state and to start running. If the amount of time elapsed since the assertion of CG4 meets or exceeds the threshold set by timer 222-13, the PG 4 signal may be asserted. Responsive to assertion of the PG4 signal, GPU north bridge interface 24 may be power gated.

As noted above, embodiments are possible and contemplated wherein the occurrence of any one of the conditions described above (with reference to FIG. 7) may cause assertion of the CG4 signal. In such embodiments, AND gate 223 may be replaced by an OR gate.

Figure 8:
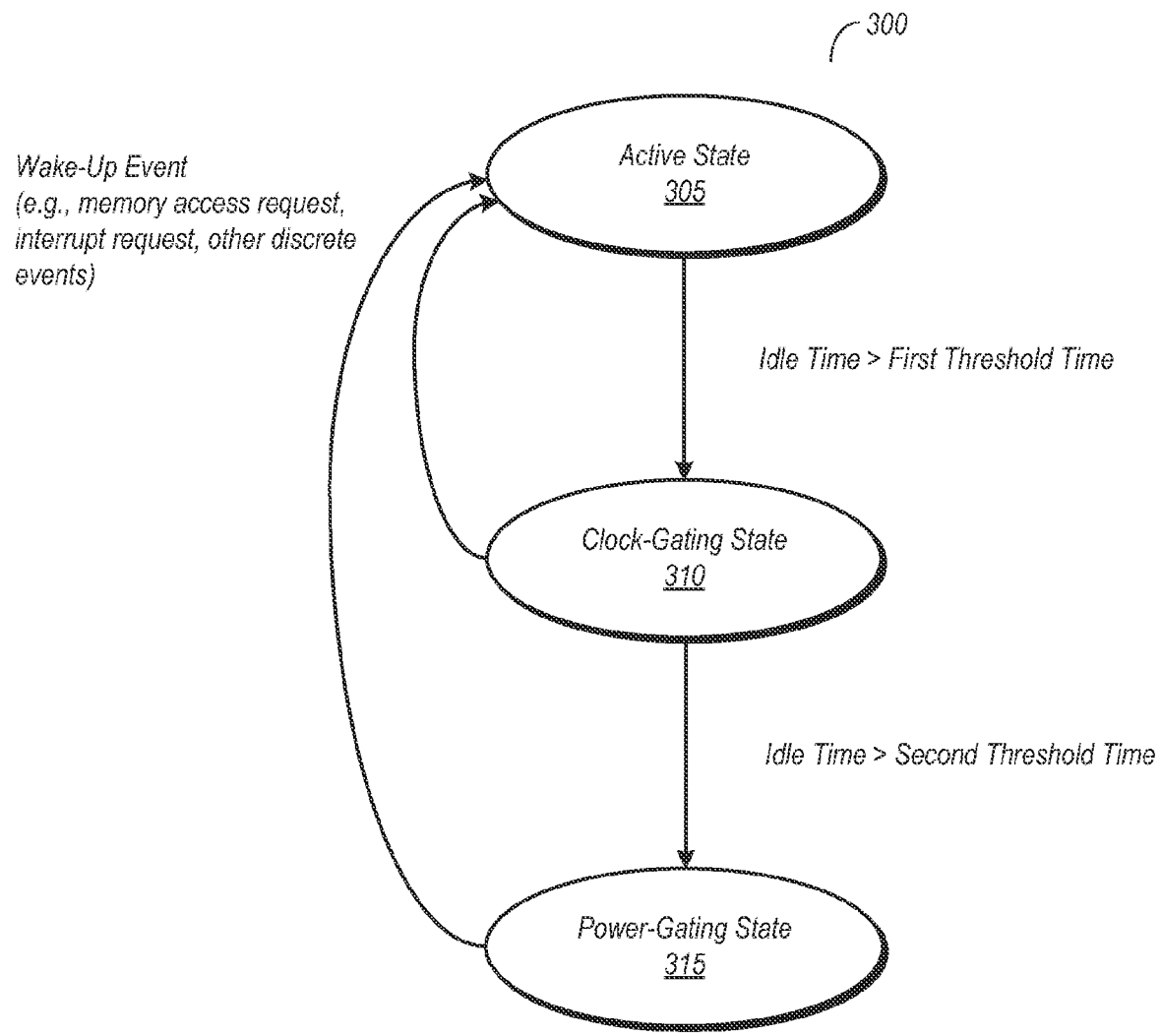
FIG. 8 is a state diagram illustrating one embodiment of operation for clock and power-gating of system components.

State Diagram and Method Flow:

FIG. 8 is a state diagram illustrating one embodiment of operation for clock and power-gating of system components. More particularly, FIG. 8 is a state diagram 300 describing the operation for clock-gating and power-gating the various functional units of one embodiment of north bridge 12. Each of the components discussed above may be in one of three different states: an active state 305, a clock-gating state 310, or a power-gating state 315.

In the active state 305, a given functional unit may operate as normal, providing an interface between two or more other units (e.g., between memory controller 18 and GPU 14). If the given functional unit is idle (inactive) for a first threshold time, a power management unit 20 may transition it to the clock-gating state 310. When in the clock-gating state 310, the functional unit may continue to receive power, but is inhibited from receiving an active clock signal. If the idle time reaches a second time threshold, then the functional unit may be transitioned to the power-gating state 315. In the power-gating state 315, the functional unit may receive neither a clock signal nor power.

A wake-up event occurs when the functional unit is in either the clock-gating state 310 or the power-gating state 315, the power management unit 20 may cause both clock-gating and power-gating of that functional unit to be discontinue, thereby enabling its return to the active state 305. Examples of wake-up events include the assertion of a memory access request (including DMA requests), an interrupt request, and so on. In general, with respect to a given functional unit, a wake-up event may be defined as any event that would necessitate that functional unit being in active state 305 (e.g., when a core interface 21 and core arbitration unit 22 are needed to facilitate communications with memory controller 18).

Figure 9:
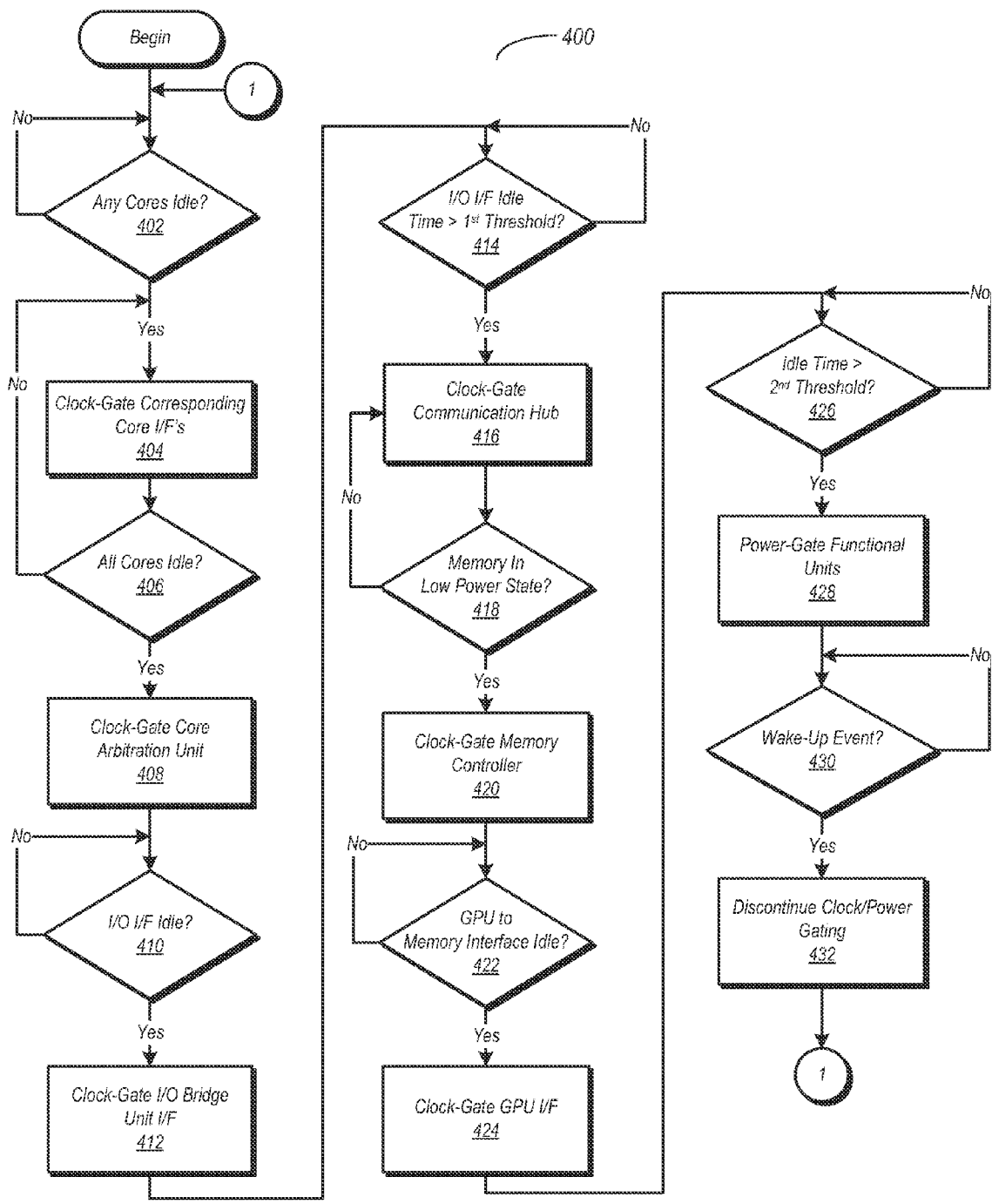
FIG. 9 is a flow diagram illustrating one embodiment of a method for clock and power-gating of system components.

A flow diagram illustrating one embodiment of a method for clock and power-gating of bridge unit components is shown in FIG. 9. It is noted that while FIG. 9 illustrates a sequence of events, that this particular sequence is not necessarily required for any particular embodiment (including the one illustrated), but instead is exemplary. While some events may be required to be performed in a certain sequence, others may be performed in any sequence. Accordingly, where possible, certain events shown in FIG. 9 (e.g., the wake-up event of block 430) may occur anywhere in the sequence. The particular position of certain events within a sequence as shown in FIG. 9 is thus for illustrative purposes only, and is not intended to be limiting.

Method 400 begins with a determination of whether or not any cores are idle (block 402). If no cores are idle (block 402, no), then no further action occurs responsive to the determination. If it is determined that at least one core is idle for at least a specified amount of time (block 402, yes), then the corresponding core interface may be clock gated (block 404). The method may also determine whether or not all cores are idle (block 406). If at least one core is idle but other cores are active (block 406, no), no further core interfaces are clock-gated, although those that were already clock-gated may remain so in the absence of any wake-up event. If it is determined that all cores are idle (block 406, yes), then, in addition to clock-gating each of the core interfaces, the core arbitration unit may also be clock-gated (block 408).

In block 410, a determination is made as to whether or not an I/O interface (e.g., a south bridge) is idle. If the I/O interface is idle (block 410), then the I/O bridge unit interface may be clock-gated (block 412). Additionally, if the I/O interface has remained idle for a time exceeding a first threshold (block 414, yes), then the communication hub may also be clock-gated (block 416). Otherwise, (block 414, no), the communication hub is not clock-gated.

If the communication hub has been clock-gated in block 416, and the memory is in a low power state (block 418, yes), then the memory control may be clock-gated (block 420). Otherwise (block 418, no), the clock-gating of the I/O bridge unit may continue per block 416, but the memory controller is not clock-gated.

If the GPU to memory interface is not idle (block 422, no), the GPU interface remains in an active state. However, if it is determined that the GPU to memory interface is idle (block 422, yes), then the GPU interface may be clock-gated. Other conditions may also cause the GPU interface to be clock-gated, such as a determination that an amount of data stored in a display buffer exceeds a predetermined threshold.

If the idle time of any one of the components of the bridge unit meets or exceeds a second threshold (block 426, yes), then that functional unit may be power-gated (block 428). If the idle time of a functional unit is less than the second threshold (block 426, no), the functional unit may remain clock-gated, or may return to an active state.

If no wake-up event occurs for a functional unit (block 430, no), then that functional unit may remain in a clock-gated state or a power-gated state. However, if a wake-up event does occur (block 430, yes), then clock-gating and power-gating may be discontinued for that unit, thereby enabling it to resume functioning in the active state. If all units are returned to the active state, then this particular method embodiment may return, via (1), to block 402.

Figure 10:
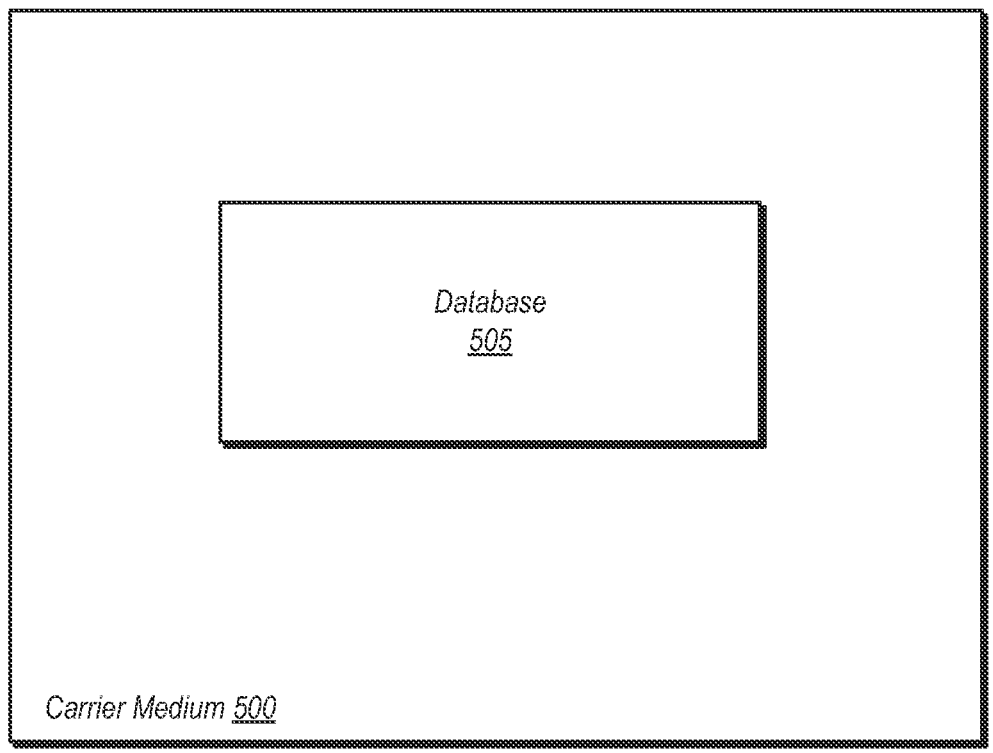
FIG. 10 is a block diagram of one embodiment of a carrier medium.

Computer Accessible Storage Medium:

Turning next to FIG. 10, a block diagram of a computer accessible storage medium 500 including a database 505 representative of the system 10 is shown. Generally speaking, a computer accessible storage medium 400 may include any non-transitory storage media accessible by a computer during use to provide instructions and/or data to the computer. For example, a computer accessible storage medium 400 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the data 505 representative of the system 10 carried on the computer accessible storage medium 500 may be a database or other data structure which can be read by a program and used, directly or indirectly, to fabricate the hardware comprising the system 10. For example, the database 505 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database 505 on the computer accessible storage medium 500 may be the netlist (with or without the synthesis library) or the data set, as desired, or Graphic Data System (GDS) II data.

While the computer accessible storage medium 500 carries a representation of the system 10, other embodiments may carry a representation of any portion of the system 10, as desired, including IC 2, any set of agents (e.g., processing cores 11, I/O interface 13, power management unit 20, etc.) or portions of agents (e.g., north bridge front end power manager 220, etc.).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system comprising:
    a bridge unit including:
        a memory controller; and
        a communication hub coupled to the memory controller; and
    a power management unit, wherein the power management unit is configured to clock-gate the communication hub responsive to each of a plurality of processor cores being in an idle state and an I/O interface unit being idle for an amount of time exceeding a first threshold, and further configured to clock-gate the memory controller responsive to clock-gating the communication hub and determining that a memory coupled to the memory controller is in a first low power state.

2. The system as recited in claim 1, further comprising a plurality of core interface units, wherein each of the core interface units is coupled between the communication hub and a corresponding one of the plurality of processor cores, and wherein the power management unit is configured to clock-gate a particular one of the core interface units responsive to determining that its corresponding processor core is in an idle state and that one or more caches in the corresponding processor core have been flushed.

3. The system as recited in claim 2, further comprising a core arbitration unit coupled to each of the plurality of core interface units, wherein the power management unit is configured to clock-gate the core arbitration unit responsive to determining that each of the plurality of core interface units is clock-gated.

4. The system as recited in claim 1, wherein the power management unit is configured to clock-gate the I/O interface unit responsive to determining that the I/O interface unit has been idle for an amount of time exceeding a second threshold.

5. The system as recited in claim 1, wherein at least one of said plurality of cores comprises a graphics processing unit (GPU) and a GPU interface unit, wherein the power management unit is configured to clock-gate the GPU interface unit responsive to determining that the GPU is idle.

6. The system as recited in claim 1, further comprising a graphics processing unit (GPU) and a GPU interface unit, wherein the power management unit is configured to clock-gate the GPU interface unit responsive to determining that the GPU is idle.

7. The system as recited in claim 6, wherein the power management unit is configured to determine that the GPU is idle responsive to receiving an indication that the GPU is no longer updating a display.

8. The system as recited in claim 6, wherein the power management unit is configured to determine that the GPU is idle responsive to an absence of memory accesses by the GPU for an amount of time exceeding a second threshold.

9. The system as recited in claim 6, wherein the GPU includes a display buffer, and wherein the power management unit is configured to cause the memory to enter the first low power state responsive to determining that an amount of data stored in the display buffer exceeds a threshold value.

10. The system as recited in claim 9, wherein the power management unit is configured to, responsive to the amount of data stored in the display buffer falling below the threshold value:
    discontinue clock-gating the memory controller; and
    cause the memory to enter an active state.

11. The system as recited in claim 6, wherein the power management unit is configured to discontinue clock-gating the GPU interface responsive to determining that the GPU is no longer idle.

12. The system as recited in claim 1, wherein the power management unit is further configured to cause power to be removed from the communication hub and the memory controller responsive to determining that the communication hub and the memory controller have been clock-gated for an amount of time exceeding a second threshold.

13. The system as recited in claim 12, wherein the power management unit is configured to restore power and discontinue clock-gating to the communication hub and the memory controller responsive to one or more of the following:
    one or more of the plurality of processor cores entering an active state;
    the I/O unit asserting a memory request.

14. A method comprising:
    clock-gating a communication hub of a bridge unit responsive to each of a plurality of processor cores being in an idle state and an I/O interface unit being idle for an amount of time exceeding a first threshold; and
    clock-gating a memory controller of the bridge unit responsive to clock-gating the communication hub and determining that a memory coupled to the memory controller is in a first low power state.

15. The method as recited in claim 14, wherein the bridge unit includes a plurality of core interface units each coupled to a corresponding one of the plurality of processor cores, and wherein the method further comprises clock-gating a particular one of the core interface unit responsive to determining that its corresponding one of the plurality of processor cores is in an idle state.

16. The method as recited in claim 15, further comprising clock-gating a core arbitration unit coupled to each of the plurality of core interface units responsive to determining that each of the core interface units is clock-gated.

17. The method as recited in claim 14, further comprising clock-gating the I/O interface unit responsive to determining that the I/O interface unit has been idle for an amount of time exceeding a second threshold.

18. The method as recited in claim 14, further comprising clock-gating a graphics processing unit (GPU) interface of the bridge unit responsive to determining that a GPU coupled to the GPU interface is idle.

19. The method as recited in claim 18, further comprising determining that the GPU is idle responsive to receiving an indication that the GPU is no longer updating a display.

20. The method as recited in claim 18, further comprising determining that the GPU is idle responsive to an absence of a memory request from the GPU for an amount of time exceeding a second threshold.

21. The method as recited in claim 18, wherein the GPU includes a display buffer, and wherein the method further comprises the memory entering the first low power state responsive to determining that an amount of data stored in the display buffer exceeds a threshold value.

22. The method as recited in claim 21, further comprising, responsive to the amount of data stored in the display buffer falling below the threshold value:
  discontinuing clock-gating the memory controller; and
  causing the memory to enter an active state.

23. The method as recited in claim 18, further comprising discontinuing clock-gating the GPU interface responsive to determining that the GPU is no longer idle.

24. The method as recited in claim 14, further comprising removing power from the communication hub and the memory controller responsive to determining that both the communication hub and the memory controller have been clock-gated for at least an amount of time exceeding a second threshold.

25. The method as recited in claim 24, further comprising discontinuing clock-gating and applying power to both the communication hub and the memory controller responsive to one or more of the following:
  one or more of the plurality of processor cores entering an active state;
  the I/O unit conveying a memory request.

26. A non-transitory computer readable medium comprising a data structure which is operated upon by a program executable on a computer system, the program operating on the data structure to perform a portion of a process to fabricate an integrated circuit including circuitry described by the data structure, the circuitry described in the data structure including:
  a bridge unit including:
    a memory controller; and
    a communication hub coupled to the memory controller; and
  a power management unit, wherein the power management unit is configured to clock-gate the communication hub responsive to each of a plurality of processor cores being in an idle state and that an I/O interface being idle for an amount of time exceeding a first threshold, and further configured to clock-gate the memory controller responsive to clock-gating the communication hub and determining that a memory coupled to the memory controller is in a first low power state.

27. The computer readable medium as recited in claim 26, wherein the circuitry described in the data structure further includes;
  a plurality of core interface units, wherein each of the core interface units is coupled between the communication hub and a corresponding one of the plurality of processor cores, and wherein the power management unit described in the data structure is configured to clock-gate a particular one of the core interface units responsive to determining that its corresponding processor core is in an idle state and that one or more caches in the corresponding processor core have been flushed; and
  a core arbitration unit coupled to each of the plurality of core interface units, wherein the power management unit described in the data structure is configured to clock-gate the core arbitration unit responsive to determining that each of the plurality of core interface units is clock-gated.

28. The computer readable medium as recited in claim 26, wherein the circuitry described in the data structure further includes a graphics processing unit (GPU) and a GPU interface unit, wherein the power management unit described in the data structure is configured to clock-gate the GPU interface unit responsive to determining that the GPU is idle.

29. The computer readable medium as recited in claim 26, wherein the power management unit described in the data structure is further configured to cause power to be removed from the communication hub and the memory controller responsive to determining that the communication hub and the memory controller have been clock-gated for an amount of time exceeding a second threshold.

30. The computer readable medium as recited in claim 29 wherein the power management unit described in the data structure is further configured to restore power and discontinue clock-gating to the communication hub and the memory controller responsive to one or more of the following:
  one or more of the plurality of processor cores entering an active state;
  the I/O unit asserting a memory request.

31. The computer readable medium as recited in claim 26, wherein the data structure comprises one or more of the following types of data:
  HDL (high-level design language) data;
  RTL (register transfer level) data;
  Graphic Data System (GDS) II data.

* * * * *